Dec. 4, 1956     H. B. VAN RENSSELAER     2,772,466
APPARATUS FOR FORMING A HOLLOW BODY OF CONCRETE OR THE LIKE
Filed Nov. 12, 1953

INVENTOR.
Hendrik B. Van Rensselaer
BY
George F. Des Marais
ATTORNEY

# United States Patent Office 2,772,466
Patented Dec. 4, 1956

2,772,466

APPARATUS FOR FORMING A HOLLOW BODY OF CONCRETE OR THE LIKE

Hendrik B. Van Rensselaer, Summit, N. J., assignor to Lock Joint Pipe Company, East Orange, N. J., a corporation of New Jersey Application November 12, 1953, Serial No. 391,415

5 Claims. (Cl. 25—30)

This invention relates to an apparatus for forming a hollow body of concrete or the like, and more particularly to an apparatus wherein a hollow mould is suspended from and rotated by a roller or shaft which extends through the mould. The mould is open-ended and includes a central cylindrical body or shell and an annular member or mould ring attached to each end of the shell. The mould is suspended from the roller by engagement of the annular members therewith. Moulding of a hollow body, such as a pipe, is accomplished by supplying a relatively dry concrete mix or other cementitious material to the mould as the mould rotates. The moulding material is distributed circumferentially of the mould and compacted by the roller. Among the objects of this invention is to facilitate the removal of a mould and a finished product from the apparatus, and the rapid conditioning of the apparatus for the forming of another product so as to make full use of the moulding capacity of this type of apparatus.

The apparatus of the present invention is so constructed that the roller and a supported mould may be easily lifted from its axis of rotation and replaced with the least loss of manufacturing time between successive moulding operations. The roller or suspension shaft comprises one unit which may be a single shaft section or an assembly of several shaft sections joined together. The roller or suspension shaft is aligned on a common axis with a shaft at each end of the roller shaft. Each of the end shafts is rotatably supported and one of these shafts is a drive shaft for the roller. Torque transmitting means between the drive shaft and the roller shaft allow for their separation in a direction normal to the comon axis. Clamping means are provided between the roller shaft and each of the other shafts whereby the weight of the roller is transmitted to the end shafts and their bearings. A member of each of the clamping means is secured either to an end shaft or to the roller in such a manner that the end shafts will support the roller when the connected shafts are not rotating, and at the same time permit the roller to be lifted from the common axis of the aligned shafts when the clamping means are opened.

For a more comprehensive understanding of the invention, reference may be had to the accompanying drawing in which.

Figure 1:
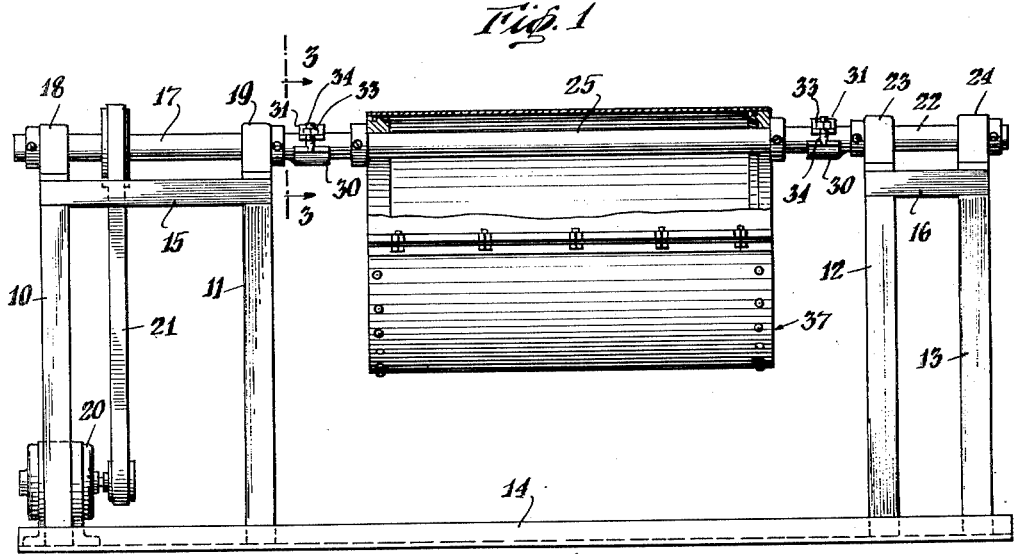
Fig. 1 is a front elevation of an apparatus embodying the invention.

The apparatus may include any suitable type of base or frame for supporting the operating members and shafts. The apparatus includes vertical frame members 10, 11, 12 and 13 supported from and spaced apart by longitudinal members 14. Bracing members 15 extend between the frame members 10 and 11, and bracing members 16 extend between the frame members 12 and 13.

An end shaft 17 is the drive shaft and it is rotatably mounted in bearings 18 and 19. A motor 20 drives the shaft 17 through a belt and pulley connection 21. The end shaft 22 is mounted in bearings 23 and 24 to rotate in alignment with the drive shaft. Axial movement of the shafts 17 and 22 is prevented by the use of thrust-resisting bearings or by employing the usual collars on the shafts. The roller or suspension shaft 25 extends between the end shafts 17 and 22 and is supported therefrom on an axis common to the three shafts.

For transmitting torque between the drive shaft 17 and the roller shaft 25, there are provided slidably engaged elements which allow for lateral separation of the shafts. A simple and effective form for these elements is a tongue and groove connection between the drive shaft and the roller shaft which includes a diametrically disposed tongue 26 on one of the shafts, and a diametrically disposed groove 27 in the end of the other. The other end of the roller shaft is preferably square to the axis of the shaft and presents a flat surface facing a similar surface on the adjacent end of the shaft 22. This arrangement enables the roller shaft to be lifted from the axis of the drive shaft without disturbing the bearings and mountings of the shafts 17 and 22.

Figure 3:
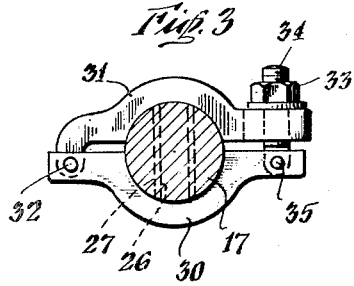
Fig. 3 is a section of the coupling between the drive shaft and the roller shaft as viewed on line 3—3 of Fig. 1.
Figure 4:
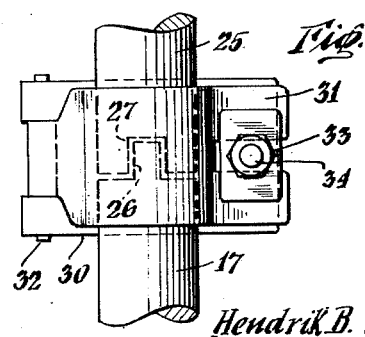
Fig. 4 is a plan of the coupling.

In order to provide for supporting the roller shaft by the shafts adjoining its ends, a sleeve-like coupling or clamping device is employed at each end of the roller. This device surrounds and overlaps an end of the roller shaft and the adjacent end of an adjoining shaft. Each of the clamping devices comprises a pair of hinged members 30 and 31 shaped to engage the adjacent ends of the aligned shafts when the clamping device is closed, Fig. 3. The hinged members are pivotally connected together at one end by a pin 32. The other end is closed by a nut 33, which contacts one member 31, and a swivel screw 34 which is pivotally connected at 35 to the other of the hinged members.

Figure 2:
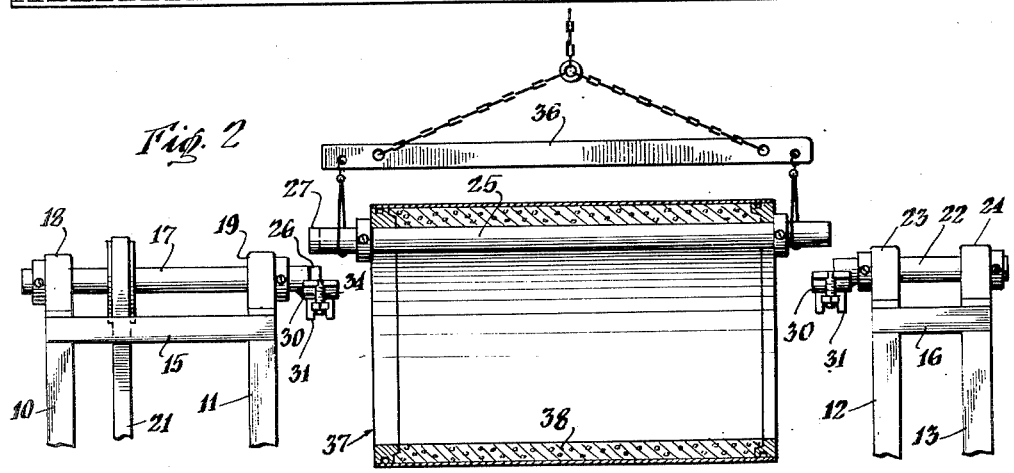
Fig. 2 is an elevational view of the same apparatus showing the roller disengaged and lifted from the supporting shafts.

The clamping devices are preferably permanently carried by either the end shafts or the roller shaft so that when the clamping devices are opened, as shown in Fig. 2, and the shafts are idle, the clamping devices and the end shafts support the roller shaft. As shown in Fig. 2, the hinged member 30 of the left hand clamping device is welded to the drive shaft 17 opposite one end of the tongue 26. The clamping device for the other end of the roller is likewise fixed to the shaft 22. As shown in Fig. 1, the shafts are at rest in positions in which the hinged members 30 are lowermost. The clamping devices may then be opened by relieving the pressure of the nuts 33 on the hinge members 31 and then swinging the screws 34 from their slots. The roller shaft may then be raised vertically by a lifting beam 36, Fig. 2. The roller shaft is used to remove the mould 37 and the moulded pipe or other product 38 from the apparatus, and the same roller shaft or another roller shaft may be used to place an empty mould in the apparatus for the next succeeding moulding operation.

The operation of the apparatus will be apparent to those skilled in the art in view of the foregoing disclosure. The principle of the invention, together with apparatus which is now considered to represent the best embodiments thereof, have been described in accordance with the provisions of the patent statutes, but it is desired it be understood that the apparatus disclosed is only illustrative and that the invention can be carried out by other means. Also, while the apparatus is designed to use the various features and elements in the combinations and relations described, some of these may be altered and others omitted without interfering with the invention and the general results outlined.

What is claimed is:

1. Apparatus for forming a hollow body of concrete or the like comprising a hollow rotary mould having spaced-apart annular members extending radially inwardly of the outer moulding surface of said mould, a roller shaft for suspending said mould, said roller shaft extending through said mould and beyond the ends of said mould, means for rotatably supporting said roller shaft, said supporting means comprising a rotatably supported shaft adjacent each end of said roller shaft, means preventing axial movement of said shafts which are adjacent the ends of said roller shaft, and means for engaging the ends of said shafts with said roller shaft.

2. The combination set forth in claim 1 in which said roller shaft is engaged to be rotated by one of said end shafts by a diametrically disposed tongue on the end of one of said shafts engaging with a diametrically disposed groove in the end of the other shaft, said groove having at least one end extending to the periphery of said shafts for enabling radial separation of said shafts as said supporting means are acting to support said roller shaft.

3. Apparatus for forming a hollow body of concerete or the like, comprising a hollow rotary mould having spaced-apart annular members extending radially inwardly of the outer moulding surface of said mould, a plurality of separate shafts aligned on a common axis, said shafts including a drive shaft, a roller shaft and a third shaft, said roller shaft being intermediate said first and third shafts and extending through said mould and beyond the ends of said mould, power means for driving said drive shaft, disengageable coupling means between said first shaft and said roller shaft and between said roller shaft and said third shaft, means rotatably supporting said first and third shafts and preventing translation thereof lengthwise of their common axis.

4. The combination set forth in claim 3 in which said coupling means include clamps surrounding and overlapping the ends of said roller shaft and the ends of said other shafts.

5. Apparatus for forming a hollow body of concrete or the like comprising a hollow rotary mould having spaced-apart annular members extending radially inwardly of the outer moulding surface of said mould, a roller shaft for suspending said mould, said roller shaft extending through said mould and beyond the ends of said mould, means for rotatably supporting said roller shaft, said supporting means comprising a rotatably supported drive shaft adjacent one end of said roller shaft and a rotatably supported shaft adjacent the other end of said roller shaft, and means at each end of said roller shaft for connecting said roller shaft to each of said shafts at its ends, each of said connecting means including sleeve-like members engaging and overlapping adjoining ends, respectively, of said shafts, and slidably engaged elements between said drive shaft and said roller shaft whereby the roller shaft may be separated laterally from said drive shaft, the sleeve-like member overlapping the adjoining ends of said drive shaft and roller shaft being carried by one of said adjoining ends of said drive shaft and roller shaft and disposed in such a position relative to said slidably engaged elements as to prevent disengagement of said elements in one direction normal to said shafts while permitting their disengagement in the opposite direction so that said roller shaft may be lifted from said supporting means by displacement of said roller shaft in said opposite direction.

References Cited in the file of this patent

UNITED STATES PATENTS

| | | |
|---|---|---|
| 402,132 | Berry | Apr. 30, 1889 |
| 1,582,586 | Dundas | Apr. 27, 1926 |
| 1,978,643 | McKettrick | Oct. 30, 1934 |
| 2,499,387 | Johnson | Mar. 7, 1950 |
| 2,560,426 | Fitzpatrick | July 10, 1951 |
| 2,630,341 | Downey | Mar. 3, 1953 |